United States Patent
Inoue

(10) Patent No.: US 6,689,324 B2
(45) Date of Patent: Feb. 10, 2004

(54) COMMUNICATION SYSTEM FOR AUTOMATIC SYNTHESIS APPARATUS

(75) Inventor: Takaaki Inoue, Moriyama (JP)

(73) Assignee: Shimadzu Corporation, Kyoto (JP)

( * ) Notice: Subject to any disclaimer, the term of this patent is extended or adjusted under 35 U.S.C. 154(b) by 436 days.

(21) Appl. No.: 09/778,939

(22) Filed: Feb. 8, 2001

(65) Prior Publication Data

US 2001/0024465 A1 Sep. 27, 2001

(30) Foreign Application Priority Data

Mar. 21, 2000 (JP) ........................................ 2000-077637

(51) Int. Cl.[7] ................................................ B01S 19/00
(52) U.S. Cl. ...................... 422/130; 422/99; 422/105; 422/107; 422/119; 422/129; 700/95; 700/96; 700/108; 700/110; 700/266; 700/268; 702/22; 702/81; 702/182; 702/183
(58) Field of Search ........................ 422/99, 105, 107, 422/119, 129, 130, 131; 700/95, 96, 108, 110, 266, 268, 269, 274; 702/19, 22, 81, 82, 83, 84, 182, 183, 184, 185

(56) References Cited

U.S. PATENT DOCUMENTS

| | | | | |
|---|---|---|---|---|
| 5,389,339 A | * | 2/1995 | Petschek et al. | 422/64 |
| 5,586,039 A | * | 12/1996 | Hirsch et al. | 364/468.01 |
| 6,029,101 A | * | 2/2000 | Yoshida et al. | 700/266 |
| 6,264,891 B1 | * | 7/2001 | Heyneker et al. | 422/64 |
| 6,332,110 B1 | * | 12/2001 | Wolfe | 702/22 |
| 6,370,454 B1 | * | 4/2002 | Moore | 701/29 |
| 6,395,235 B1 | * | 5/2002 | Kilcoin et al. | 422/103 |
| 6,455,316 B1 | * | 9/2002 | Turner et al. | 436/37 |
| 6,489,168 B1 | * | 12/2002 | Wang et al. | 436/37 |
| 6,560,543 B2 | * | 5/2003 | Wolfe et al. | 702/22 |
| 2002/1038220 | * | 9/2002 | Birkner et al. | 702/84 |

* cited by examiner

*Primary Examiner*—Jill Warden
*Assistant Examiner*—Dwayne K Handy
(74) *Attorney, Agent, or Firm*—Kanesaka & Takeuchi

(57) ABSTRACT

A communication system for automatic synthesis apparatus is formed of an automatic synthesis apparatus and a computer connected to the automatic synthesis apparatus. The automatic synthesis apparatus has a reaction block to produce synthetic compounds along synthesis procedures, and an operation notification creation device for creating operation notification mails according to operating conditions in the synthesis procedures. The computer includes a per-operation transmission setting device for setting to the automatic synthesis apparatus as to whether transmissions of the operation notification mails along the synthesis procedures to the computer are performed or not, and an operation notification mail display device for displaying the operation notification mail. The operating conditions can be monitored by the operation notification mail display device as desired.

4 Claims, 7 Drawing Sheets

| Electronic Mail | □ □ ⊠ |
|---|---|
| Electronic Mail Generated Document: Agitating. Distribution-agitation-discharge-distribution normally finished. Awaiting instruction. | |

COMMUNICATION SYSTEM FOR AUTOMATIC SYNTHESIS APPARATUS

BACKGROUND OF THE INVENTION AND RELATED ART STATEMENT

The invention relates to a communication system for automatic synthesis apparatus that controls an automatic synthesis apparatus which automatically produces synthetic compounds. In particular, it relates to a technology for understanding an operating condition during a synthesis procedure (synthesis protocol) for performing a synthesis reaction.

The automatic synthesis apparatus of the past, which is used in research fields such as pharmaceuticals, life sciences, chemicals, and materials, comprises a reaction block in which is arranged a plurality of reaction vessels which performs synthesis reactions. The apparatus produces synthetic compounds in each reaction vessel by distributing reagents and solvents, and the like, respectively into each reaction vessel based on predetermined synthesis protocols along the synthesis procedures, and promoting synthetic reactions in each reaction vessel, for example, by heating and shaking the reaction block.

A series of procedures for synthesis reactions, that is, a synthesis protocol, is constituted by the procedures of each process, such as distribution, agitation, cleaning of the vessels, and extraction. For example, setting of the procedures in the distribution process includes selection of reagents and solvents, and the like, to be distributed into each reaction vessel, determination of the quantities of attraction of the reagents and solvents, and the like, selection of each reaction vessel to be the targets of distribution, setting of the quantities to be distributed, and the like. Also, setting of the procedures in the agitation process, specifically a series of procedures that shake the reaction block and agitate the contents of the reaction vessels, includes setting of the speed of rotation of the electrical motor for rotationally shaking the reaction block, setting of time of agitation, setting of the temperature of the reaction block, and the like. In the other processes as well, the control procedures of the apparatus according to the process are set in the same manner.

However, in the prior art which is constituted as such, there is a problem such that the current operating condition in the synthesis protocol is not understood.

In most of the processes in the synthesis protocol, the apparatus is controlled automatically based on the synthesis protocol, but there are also processes that are performed manually. For example, in a liquid phase reaction, after having performed synthesis by distributing reagents and solvents, and the like, there are processes of inputting resin particles and removing superfluous reagents other than the synthetic compound. Because the quantity of input of the resin particles and the timing of input of the resin particles differ according to the conditions of the progress of the liquid phase reaction, this process is performed manually. When performed manually in this manner, it is absolutely essential to understand the current operating conditions. Also, even with processes that are not originally designed to be performed manually, there occur cases, such as switching to manual according to unforeseeable circumstances and changing the synthesis protocol during the synthesis reaction. Accordingly, it becomes important to prepare for unforeseeable circumstances, such as the above, by always understanding the current operating conditions. Also, by always understanding the current operating conditions, the efficiency of operations is improved, and preventing a failure during the synthesis reaction in advance is accomplished.

However, because the above synthesis protocol is constituted by various processes, it is difficult to understand how far the condition of progress of the reaction has advanced in a synthesis reaction, that is, to understand the current operating conditions. In order to actually understand the current operating conditions, there was no method other than confirming the contents of the apparatus with the naked eye of the operator. Because of the above reason, not only the efficiency of operation becomes worse, but also it causes to failure during the synthesis reaction. Therefore, in order to solve the above-mentioned problems, methods of creating and sending error notification mail when disorders and failures have occurred during operation of the apparatus, and the like, have been used.

That is, the apparatus and a computer are interconnected by a communication circuit, error notification mail is created on the apparatus when disorders during the operation of the apparatus and failures during the synthesis reactions have occurred, and the error notification mail is displayed on the screen of the computer as electronic mail. By using a communication system for the automatic synthesis apparatus having combined the apparatus and the computer, the operator can understand the current operating conditions on the side of the computer when a failure, and the like, has occurred. However, when the failure, and the like, has not occurred, creation and transmission of error notification mail is not performed on the computer. Accordingly, when the failure, and the like, has not occurred, it still is not possible to understand the current operating condition, and it does not become a fundamental solution of the above-mentioned problem.

The invention has been made in consideration of the state of affairs such as above, and it is an object of the invention to provide a communication system for an automatic synthesis apparatus that can easily understand the operating conditions during a synthesis protocol.

Further objects and advantages of the invention will be apparent from the following description of the invention.

SUMMARY OF THE INVENTION

The present invention has been made in order to achieve such goal. That is, the communication system pertaining to the invention as defined in the first aspect is a communication system for automatic synthesis apparatus, which comprises an automatic synthesis apparatus, and a computer interconnected by a communication circuit. The automatic synthesis apparatus has a reaction block in which is arranged a plurality of reaction vessels which performs synthesis reactions, and produces synthetic compounds in the reaction vessels by performing synthesis by distributing a plurality of kinds of reagents and solvents into the reaction vessels. The automatic synthesis apparatus is provided with operation notification creation means that creates operation notification mail according to operating conditions in synthesis procedures. The computer is provided with per-operation transmission setting means that sets to the automatic synthesis apparatus as to whether the transmission of operation notification mail for each operation is performed or not to the computer, and operation notification mail display means that displays the operation notification mail transmitted from the automatic synthesis apparatus by the per-operation transmission setting means.

Also, the invention in the second aspect is a communication system for the automatic synthesis apparatus as in the first aspect, wherein the automatic synthesis apparatus is further provided with error notification creation means that creates error notification mail at times when disorders occur during the operation, and the computer is provided with error notification mail display means that displays the error notification mail created by the error notification creation means and transmitted from the automatic synthesis apparatus.

The operation of the invention as defined in the first aspect is explained. Operation notification mail is created on the apparatus by the operation notification creation means. Setting of the operation notification mail in each operation is performed to the apparatus by the per-operation transmission setting means, and based on that setting, it is transmitted from the apparatus to the computer by way of the communication circuit that interconnects the apparatus and the computer pertaining to the present invention. This transmitted operation notification mail is displayed by the operation notification mail display means. By the operation described above, the operator understands the current operating conditions on the side of the computer.

BRIEF DESCRIPTION OF THE DRAWINGS

FIG. 6 is an explanatory view showing a screen displaying operation notification mail.

DETAILED DESCRIPTION OF PREFERRED EMBODIMENT

Hereinbelow, embodiments of this invention will be explained with reference to the drawings.

Figure 1:
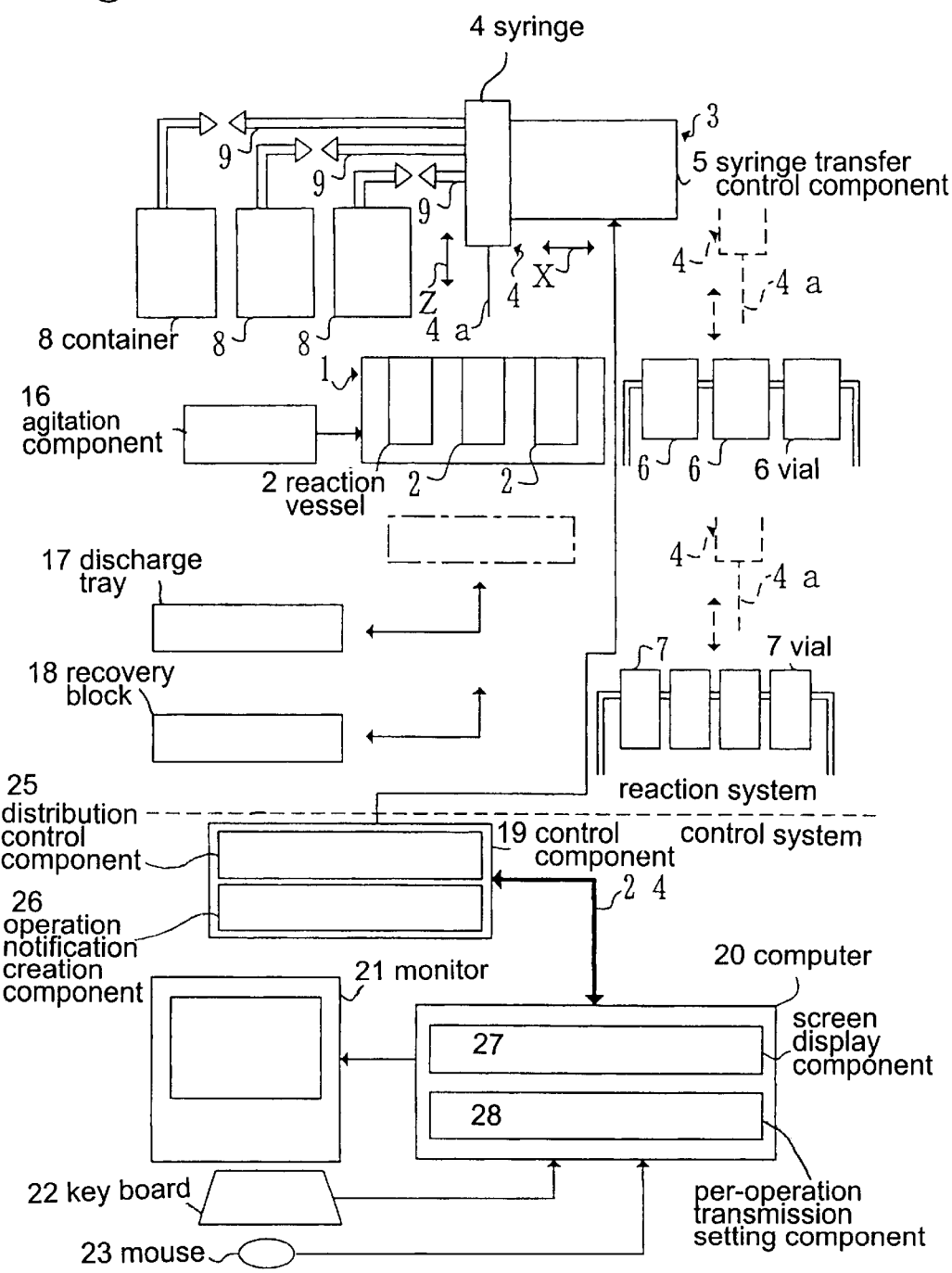
FIG. 1 is a block diagram showing the overall configuration of a communication system for an automatic synthesis apparatus pertaining to an embodiment of the invention.
Figure 2:
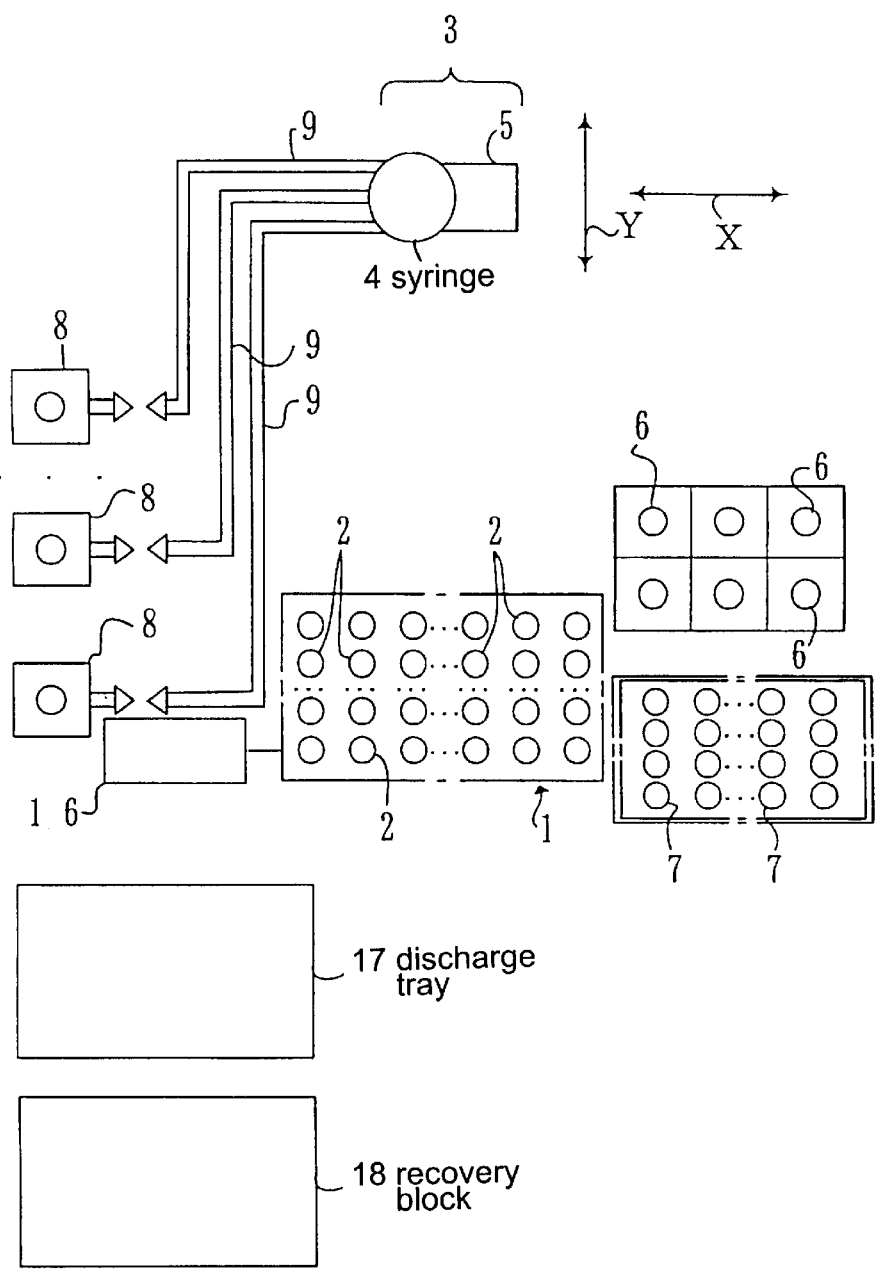
FIG. 2 is a plan view showing the configuration of the reaction system of the automatic synthesis apparatus pertaining to the embodiment.
Figure 3:
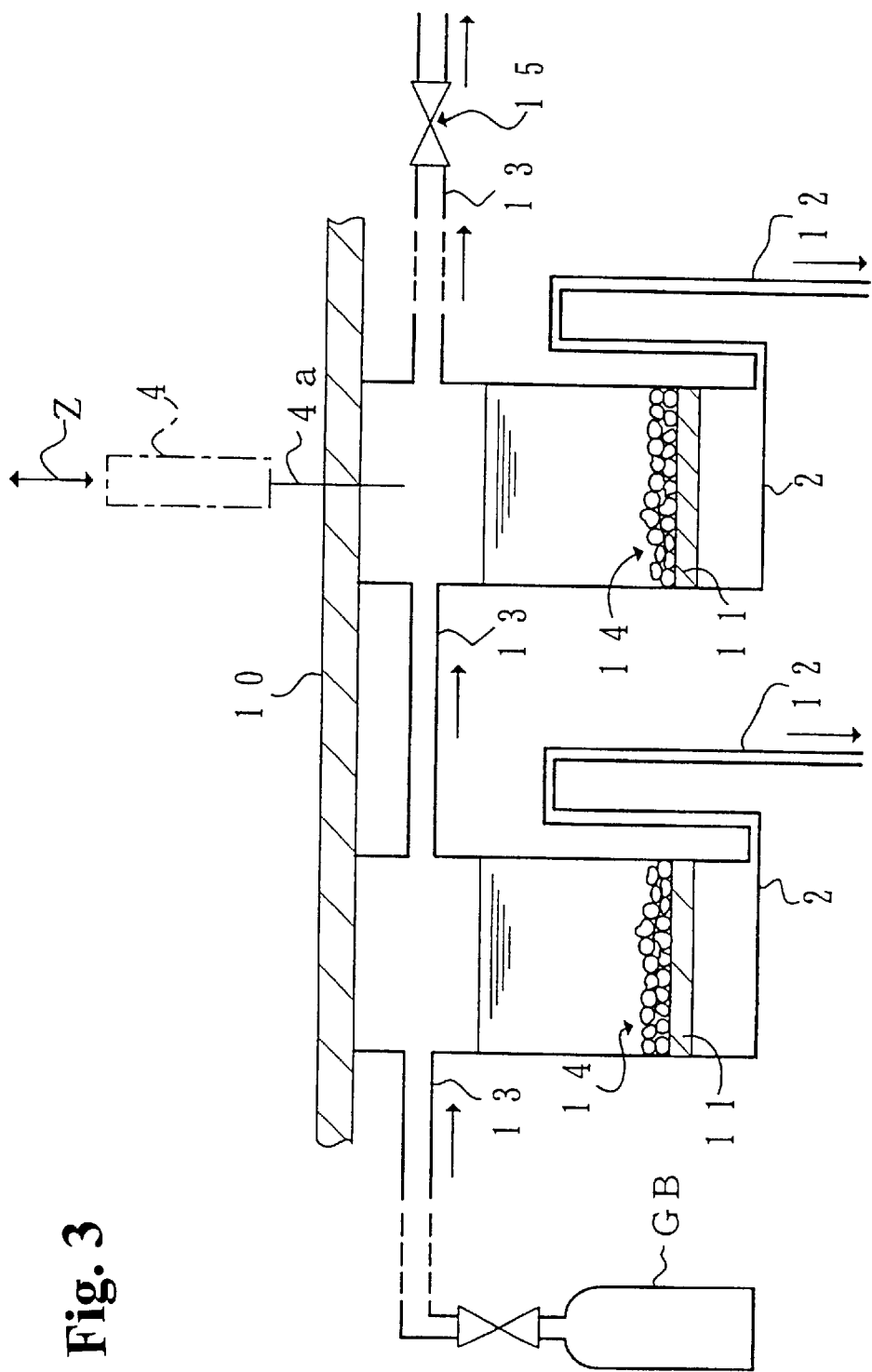
FIG. 3 is a schematic diagram showing the configuration of the essential components of the reaction block in the automatic synthesis apparatus pertaining to the embodiment.

FIG. 1 is a block diagram showing the overall configuration of a communication system for an organic automatic synthesis apparatus pertaining to the embodiment of this invention (below, abbreviated as "system of the embodiment"). FIG. 2 is a plan view showing the configuration of the reaction system of the system of the embodiment, that is, the automatic synthesis apparatus pertaining to the embodiment. FIG. 3 is a schematic diagram showing the configuration of the essential components of the reaction block in the automatic synthesis apparatus pertaining to the embodiment.

The system of the embodiment, as shown in FIG. 1, is formed of a reaction system by which synthetic reactions are actually performed, and a control system that controls the operation of the reaction system. Below, the explanation is given from the configuration of the reaction system of the embodiment, that is, the automatic synthesis apparatus pertaining to the embodiment.

The automatic synthesis apparatus pertaining to the embodiment (below, abbreviated as "apparatus of the embodiment") comprises a reaction block 1 in which is arranged a plurality of reaction vessels 2 which performs synthesis reactions, and a liquid distribution component 3 that distributes reagents and solvents to the reaction vessels 2 according to the predetermined distribution procedures (distribution protocols). The respective reaction vessels 2, as shown in FIG. 2, are arranged in the reaction block 1 in a crisscross matrix arrangement. The number of reaction vessels 2 disposed in the reaction block 1 is not limited to a specific number, but for example, the reaction vessels may be tens or several hundreds, such as 96 or 384. In the case of the apparatus of the embodiment, the reagents and the solvents are distributed and supplied to the reaction vessels 2 by a common distribution mechanism, but the reagents and the solvents may be distributed and supplied by respectively separate distribution mechanisms.

The liquid distribution component 3 comprises a syringe 4, and a syringe transfer mechanism component 5 that transfers this syringe 4 left and right (X), forward and backward (Y), and up and down (Z). According to the instruction signals from the control system, the syringe transfer mechanism component 5 is operated, so that the syringe 4 is transferred to the necessary position.

Meanwhile, on the side of the reaction block 1, frequent use large reagent vials 6 containing much used chemical liquids, and the like, and common use small reagent vials 7 containing less used chemical liquids, and the like, respectively are disposed in the necessary numbers. Also, solvent containers (gallon bottles) 8 containing solvents also are disposed on the side of reaction block 1 in the necessary number. Each solvent container 8 is connected to the syringe 4 by respective liquid transfer lines 9.

When a chemical liquid is distributed and supplied to the reaction vessel 2, as illustrated by the dotted line in FIG. 1, the syringe 4 is moved to the frequent use reagent vial 6 or common use reagent vial 7 containing the chemical liquid as an object of distribution, and the chemical liquid is attracted from a syringe needle 4a. Then, the syringe 4 is moved to the position of the reaction vessel 2 as a target of distribution of the chemical liquid, and then, the attracted chemical liquid is injected from the syringe needle 4a into the reaction vessel 2.

When the solvent is distributed and supplied to the reaction vessel 2, the solvent is introduced into the syringe 4 by way of the liquid transfer line 9 from the solvent container 8 in which the solvent as the object of distribution is reserved, and the syringe 4 is moved to the position of the reaction vessel 2 as a target of distribution of the solvent. The introduced solvent is injected from the syringe needle 4a into the reaction vessel 2.

In the case of the reaction block 1 of the apparatus of the embodiment, as shown in FIG. 3, there are provided a sheet-like common septum 10 that caps the injection port of each reaction vessel 2, a press-through type filter 11 that is attached to each reaction vessel so as to plug the inside of the bottom of reaction vessel 2, and a drain 12 piped to each reaction vessel for connecting to the bottom of reaction vessel 2. Additionally, on the side of the injection port of the reaction vessel 2, there is provided a gas introduction line 13 that introduces pressurized gas (for example pressurized inert gas) from a gas canister GB. Accordingly, in the event of injection of a reagent or injection of a solvent, the syringe needle 4a pierces the common septum 10 and advances into the middle of the reaction vessel 2. Also, inside each reaction vessel 2, there is respectively input a suitable quantity of resin particles 14 for solid phase reaction, and in addition, the terminal end of a gas introduction line 13 is provided with a valve 15. The valve 15 is closed when a pressurized gas is introduced into the reaction vessel 2.

Also, in the apparatus of the embodiment, there is disposed an agitation component 16 that shakes the resin particles 14 inside each reaction vessel 2 by causing the reaction block 1 during execution of the synthetic reaction to vibrate. In addition, a discharge tray 17 that discharges unnecessary substances produced in each reaction vessel 2 in the reaction processes, and a recovery block 18 that recovers for each reaction vessel 2 the synthetic compound obtained in each reaction vessel 2 by the synthetic reaction, respectively, are disposed so as to move between the position beneath the reaction block 1 and the waiting position.

In a synthesis process in the apparatus of the embodiment, a solid phase reaction progresses in the resin particles 14 in each reaction vessel 2 to which the necessary reagents and solvents were distributed and supplied, and the objective synthetic compound is obtained. After the end of the synthesis reaction, an extracting (acidic) chemical liquid for extracting the compound produced inside the resin particles 14 is sent from the injection port. Once the compound is extracted, pressurized gas in the gas canister GB is introduced from the gas introduction line 13, and the synthetic compound is passed through the press-through type filter 11 together with the extracting solvent, and is dumped from the drain 12 to the recovery block 18.

Next, the configuration of the control system of the embodiment is explained. In the case of the system of the embodiment, it is constituted by a control component 19 that controls the automatic synthesis apparatus and a computer 20. As shown in FIG. 1, the control component 19 pertaining to the embodiment is provided with the characteristic constituents for suitably creating operation notification mail and error notification mail, and sending the operation notification mail and the error notification mail, to be described later, in addition to a video display monitor that displays various screens necessary for operation of the apparatus and suitably executes various controls necessary for operation of the apparatus, not illustrated, and input operation devices for example, such as a keyboard and a mouse (pointing device) for input operations, not illustrated, connected to this control component 19.

On the other hand, the computer 20 pertaining to the embodiment is provided with the characteristic constituents for displaying the operation notification mail and the error notification mail, and setting whether or not transfer of the operation notification mail for each operation is performed, to be described later, in addition to a video display monitor 21, input operation devices, such as a keyboard 22 and a mouse 23, for input operations, which are connected to this computer 20, and a communication circuit 24 for interconnecting the control component 19 and the computer 20 to perform transmission of mail, and the like. Below, specific explanation is given mainly on these characteristic constituents. The communication circuit 24 is not particularly limited as long as it is constituted such that bidirectional communication can be performed, such as a signal line, interface, or cable, connecting the two.

The control component 19 pertaining to the embodiment is provided with a distribution control component 25 that sends to the liquid distribution component 3 instructional signals for distribution operations executed according to the distribution procedures in the synthesis protocol, and an operation notification creation component 26 that creates operation notification mail based on operating conditions during the synthesis protocol.

The distribution control component 25 sends to the liquid distribution component 3 the instructional signals according to the distribution processes included in the synthesis protocol. Also, the instructional signals according to other processes included in the synthesis protocol also are sent to the corresponding mechanisms on the side of the reaction system. Also, by the execution of each process included in the synthesis protocol, the synthetic compounds according to the respective conditions are respectively produced in each reaction vessel 2.

The operation notification creation component 26 creates operation notification mail for each operation according to each process in the synthesis protocol. For example, when the synthesis reaction has progressed up to the agitation process, operation notification mail related to the agitation process, such as "agitating, distribution-agitation-discharge-distribution normally finished, awaiting instruction," is created by the operation notification creation component 26. In the same manner, in each of the other processes as well, operation notification mails related to those processes are created by the operation notification creation component 26. Also, this operation notification creation component 26 corresponds to the operation notification creation means in the present invention.

Meanwhile, the computer 20 pertaining to the embodiment is provided with a screen display component 27 that displays to the video display monitor 21 screens necessary for operation of the apparatus and the transmitted notification mail, and a per-operation transmission setting component 28 that sets to the control component 19 as to whether or not transmission of operation notification mail for each operation is performed to the computer 20.

The screen display component 27 suitably displays various screens, such as a synthesis protocol setting screen for the operator to set the synthesis protocol, an operation notification mail display screen for displaying operation notification mail, an error notification mail display screen for displaying error notification mail, and a notification mail transmission setting screen that sets whether or not the transmission of operation notification mail is performed for each operation. The operation notification mail display screen displayed to this screen display component 27 corresponds to the operation notification mail display means.

Figure 4:
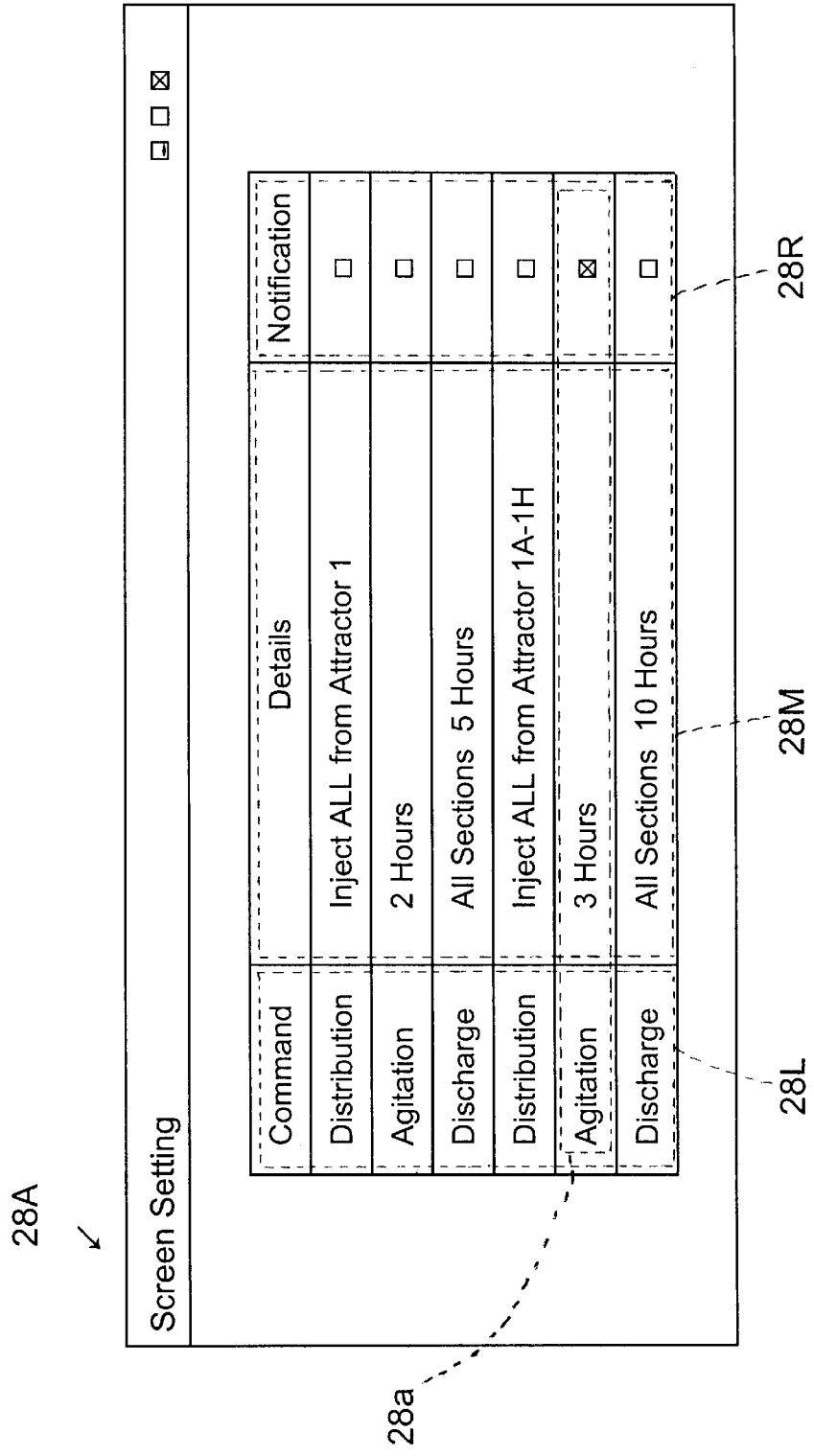
FIG. 4 is an explanatory view showing a screen for setting of transmission of notification mail.

The per-operation transmission setting component 28 displays a notification mail transmission setting screen 28A to the video display monitor 21, and sets from the notification mail transmission setting screen 28A as to whether or not the transmission of operation notification mail is performed for each operation. Describing in more detail, setting as to whether or not the mail transmission is performed to the computer 20 is performed based on input settings, such as clicking with the mouse 23 for each operation, here for each command, in each process in the synthesis protocol. For example, as shown in FIG. 4, a situation where the mail transmission is performed only for the command (operation) where "Command" in the left-most column 28L is "agitation" and "Details" in the center column 28M is "3 hours," that is, the mail transmission is performed in the specified area 28a, and mail transmission is not performed for the other commands, i.e. the areas other than the specified area 28a, is explained.

In the above-mentioned case, among the plurality of empty boxes, "Notification", recorded in the right-most column 28R, only the empty box corresponding to the area of the specified area 28a is clicked with the mouse 23. This means that transmission of operation notification mail is performed only for the command corresponding to the area of the specified area 28a, and the transmission of operation notification mail is not performed for the commands corresponding to the areas other than the specified area 28a. Also, the above-mentioned notification mail transmission setting screen 28A is for the transmission setting only for operation notification mail, and for the various kinds of mail other than operation notification mail, for example error notification mail, the mail transmission is performed as usual. The above-mentioned transmission setting is not particularly limited to the input setting method by clicking with the mouse 23, and in addition, there is the input setting method by key input with the keyboard 22, and the like. When setting the mail transfer for a plurality of commands, the mail transfer is accomplished by selecting a plurality of empty boxes. Also, this per-operation transmission setting component 28 corresponds to the per-operation transmission setting means in the present invention.

The configuration of the control system of the embodiment mentioned above is constructed mainly on a personal computer and software (computer program). Also, the memory, and the like, not illustrated, inside the control component 19 and computer 20, is constituted by memory devices, such as RAM and ROM, and the process control components, such as screen display component 27 and per-operation transmission setting component 28, inside the computer 20, are constituted by a CPU which executes the programs for performing those processes.

Figure 5:
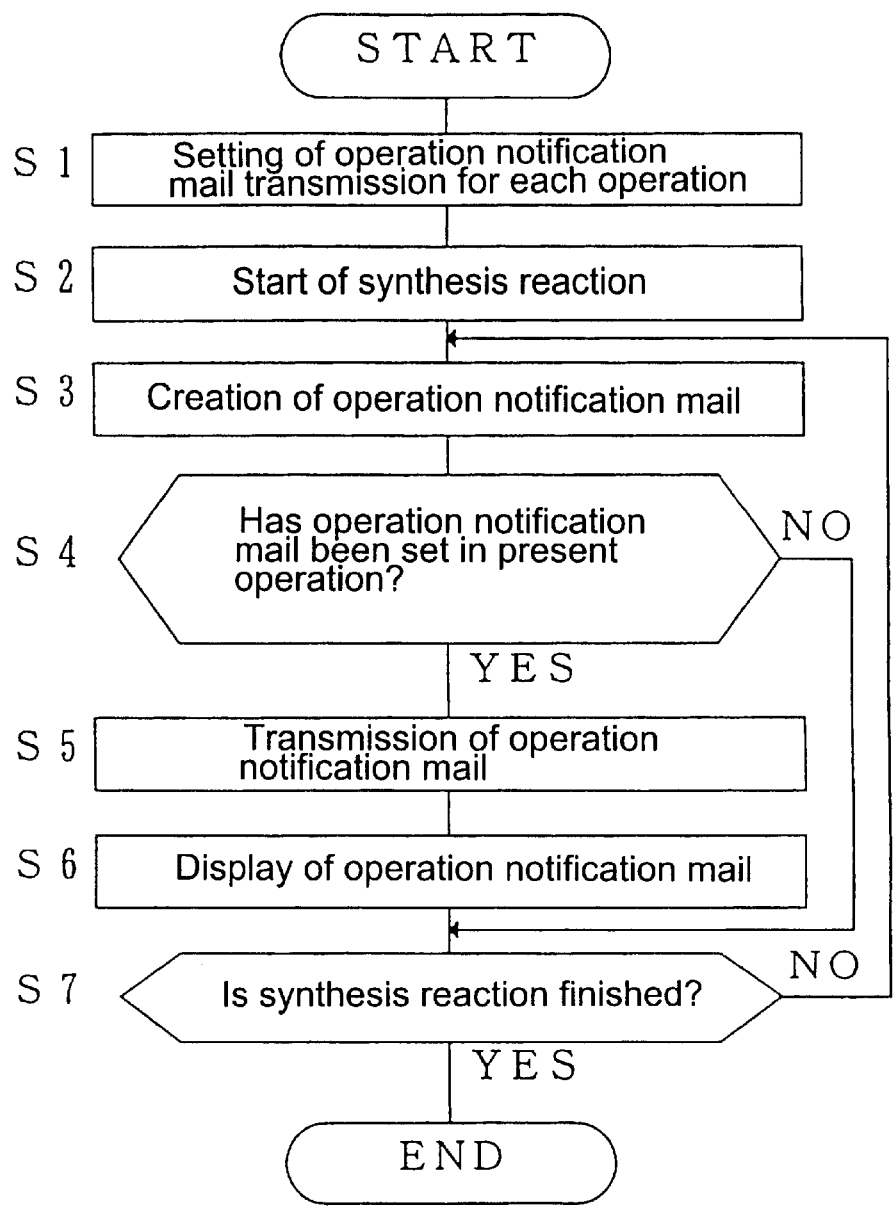
FIG. 5 is a flow chart showing in time sequence the processing of the characteristic components of the system of the embodiment.

Next, the processing of the characteristic components of this invention in the system of the embodiment having the above-mentioned configuration is explained in time sequence while referring to the flow chart shown in FIG. 5. It is assumed that the necessary settings, such as distribution procedures and recovery procedures of the chemical liquids and solvents, and the like, are already finished, and that preparations for the synthetic reaction are already in the complete stage.

Step S1 (Setting of Transmission of Notification Mail for Each Operation)

The notification mail transmission setting screen 28A as shown in FIG. 4 is displayed to the video display monitor 21 on the computer 20 based on input settings by the operator using the keyboard 22 and mouse 23. Only the empty box corresponding to the command (operation) to transmit operation notification mail is clicked with the mouse 23. Step S1 corresponds to the function of the per-operation transmission setting means in the present invention.

Step S2 (Start of Synthesis Reaction)

When the above settings are finished, the synthesis reaction is started according to each procedure, such as distribution, agitation, cleaning of vessel, and extraction.

Step S3 (Creation of Operation Notification Mail)

The operation notification creation component 26 creates operation notification mail for each operation in the synthesis protocol. Step S3 corresponds to the function of the operation notification creation means in the present invention.

Step S4 (Determination of Setting of Transmission of Notification Mail in Current Operation)

When the current operation in the synthesis reaction corresponds to an operation set for the transmission of operation notification mail on the notification mail transmission setting screen 28A, the processing jumps to the next step S5. Conversely, when it does not correspond to an operation set for transmission, the processing jumps to step S7.

Step S5 (Transmission of Operation Notification Mail)

The operation notification mail related to the current operation created by the operation notification creation component 26 is transmitted from the operation notification creation component 26 in the control component 19 to the computer 20 by way of the communication circuit 24.

Step S6 (Display of Operation Notification Mail)

The transmitted operation notification mail related to the current operation is displayed to the operation notification mail display screen 27A on the video display monitor 21 as shown in FIG. 6 by the screen display component 27. For example, when it has progressed up to the agitation process in the synthesis reaction, as described previously in the explanation of the operation notification creation component 26, operation notification mail related to the agitation process, such as "agitating, distribution-agitation-discharge-distribution normally finished, awaiting instruction," is displayed on the operation notification mail display screen 27A. By this display, the operator always can understand the current operating conditions. Step S6 corresponds to the function of the operation notification mail display means in the present invention.

Step S7 (Determination of End of Synthesis Reaction)

If subsequent operations remain, the processing returns to step S3, and operation notification mail related to the next operation is created. If there is no subsequent operation, it is treated such that the current operation is finished, and the synthesis reaction comes to an end.

As described in detail above, by the system of the embodiment, operation notification mail is created by the operation notification creation component 26 in the control component 19, and setting of operation notification mail in each operation is performed by the per-operation transmission setting component 28. Operation notification mail is transmitted from the control component 19 to the computer 20 by way of the communication circuit 24 only for operations set for transmission by the per-operation transmission setting component 29. Furthermore, because the transmitted operation notification mail is displayed to the operation notification mail display screen 27A on the computer 20 by the screen display component 27, the operator always can understand the current operating condition on the side of the computer. As a result, it is possible to improve the efficiency of the operation and to prevent failures in synthesis reactions in advance. Also, because operation notification mail is transmitted and is displayed on the screen only for operations set for transmission, operation notification mail can be displayed only for necessary operations, and it can be simplified.

This invention is not limited to the above-mentioned embodiment, and modifications can be implemented as below.

Figure 7:
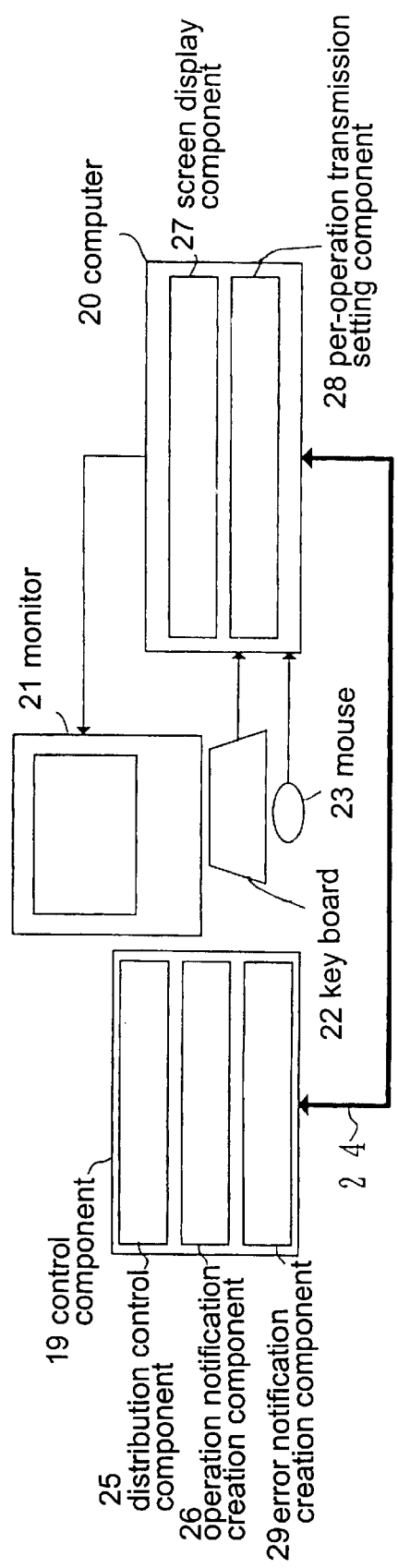
FIG. 7 is a block diagram showing the configuration of the control system in the modified example of the apparatus of the embodiment.

(1) In the system of the embodiment described above, inside the control component 19, as shown in FIG. 1, there is provided the operation notification creation component 26 which creates operation notification mail, but as shown in the modified example in FIG. 7, it also may be configured that an error notification creation component 29, which creates error notification mail when disorders during the operation of the apparatus and failures during the synthesis reactions have occurred, is also provided in the control component 19. In the system having the above-mentioned configuration, error notification mail created by the error notification creation component 29 is transmitted to the computer 20 by way of the communication circuit 24. Further, the transmitted error notification mail is displayed by the screen display component 27 as an error notification mail display screen 27B (not shown) for displaying error notification mail.

By the operation described above, in addition to the current operating conditions, error notification mail is displayed at the error notification mail display screen on the video display monitor 21 also when disorders during the operation of the apparatus and failures during the synthesis reactions have occurred. Accordingly, the operator always can understand the current operating conditions and the occurrence of failures of the apparatus, and the like. The operation notification mail display screen 27A and the error notification mail display screen 27B may be displayed to be overlaid, and the operation notification mail display screen 27A and the error notification mail display screen may be displayed on the same screen with operation notification mail and error notification mail as one notification mail display screen. Also, this error notification creation component 29 corresponds to the error notification creation means in the present invention, and the error notification mail display screen 27B corresponds to the error notification mail display means.

(2) In the system of the embodiment described above, setting as to whether or not the transmission of the operation notification mail is performed for each operation is made by using the notification mail transmission setting screen 28A in step S1, but step S1 also can be skipped. In the case described above, operation notification mails relative to all processes are transmitted in sequence for the respective operations and are displayed on the screen. Also, because they are all transmitted in sequence for the respective operations, step S4 (determination of setting of transmission of notification mail in current operation) become unnecessary, step S4 can be skipped along with step S1, and reduction of time in the synthesis reactions can be accomplished. Also, before step S1, there also may be provided an interactive step, such as to have the operator select whether setting of transmission of operation notification mail for each operation is made by using the notification mail transmission setting screen 28A, or skip step S1 altogether.

(3) In the system of the embodiment described above, operation notification mail for each operation is created in relation to all processes in step S3, and whether the transmission of operation notification mail is performed for each operation is determined in step S4 based on the settings for the transmission of operation notification mail in step S1, but it also may have a procedure in advance such that operation notification mail for each operation is created in step S3 only when it corresponds to an operation set for transmission of operation notification mail in step S1. Operation notification mail for each operation is not created when it does not correspond to an operation set for transmission. When the above-mentioned procedure is performed, the load on the device that creates operation notification mail becomes lighter, and reduction of time for creating operation notification mail by the portion of operations not transmitted can be accomplished.

(4) In the system of the embodiment described above, as shown in FIG. 4, it was explained that one or more empty boxes on the notification mail transmission setting screen 28A is selected based on the input operations with the mouse 23, and the like, but it also may be a configuration such that, if one empty box on the notification mail transmission setting screen 28A is not even selected, operation notification mails related to all processes are transmitted in sequence for each operation and are displayed on the operation notification mail display screen 27A. Also, there may have a configuration such that notification mail of the end of the synthesis reaction, such as "the synthesis protocol is finished," is displayed automatically to the operation notification mail display screen 27A when the synthesis reaction is finished, or whether the above-mentioned notification mail of the end of the synthesis reaction is transmitted or not is set on the notification mail transmission setting screen 28A.

(5) In the system of the embodiment described above, setting of the transmission of notification mail for each operation (step S1) is performed by using the notification mail transmission setting screen 28A before the synthesis reaction is started (step S2), but it is possible also to change the settings for the transmission of notification mail for each operation in a midcourse during the reaction, that is, even in step S2 and thereafter, by suitably calling up the notification mail transmission setting screen 28A.

(6) The automatic synthesis apparatus of the embodiment pertains to the organic automatic synthesis apparatus, and it was configured such that compounds are synthesized by solid phase reactions, but the automatic synthesis apparatus of this invention also may be an inorganic automatic synthesis apparatus, and it may be an apparatus with a configuration such that compounds are synthesized by liquid phase reactions. Also, in the case of the liquid phase reactions, as was described previously in the problems, because the quantity of input of the resin particles 14 and the timing for input of the resin particles 14 differs according to the conditions of progress of the liquid phase reaction, it is performed manually. When selection is made by the mouse 23, and the like, on the notification mail transmission setting screen 28A in relation to an operation (command) immediately before the input of the resin particles 14, it is displayed on the operation notification mail display screen 27A immediately before the input of the resin particles 14, whereby the operator can understand the timing for the input of resin particles 14. As a result, it is possible to improve the efficiency of operation during the input of the resin particles 14, and to prevent failures during the synthesis reactions in advance.

(7) In the automatic synthesis apparatus pertaining to the embodiment described above, the reaction system was one group, but an apparatus with a configuration such that two groups of the reaction systems are controlled by one control system can be mentioned as a modified example.

As described in detail above, by the communication system for the automatic synthesis apparatus pertaining to the invention in the first aspect, because the apparatus and the computer are interconnected by a communication circuit, the operation notification mail created by the operation notification creation means is transmitted from the apparatus to the computer. Furthermore, because the operation notification mail having been transmitted is displayed by the operation notification mail display means, the operator always can understand the current operating condition on the side of the computer. Also, by always understanding the current operating condition, it is possible to improve the efficiency of operations, and to prevent failures during the synthesis reactions in advance. As an additional effect, because the setting in each operation is performed by the per-operation transmission setting means and operation notification mail is transmitted to the computer, it is possible to display operation notification mail according to the setting.

Accordingly, the operation notification mail can be simplified to the minimum extent.

In the communication system for the automatic synthesis apparatus pertaining to the invention in the second aspect, because the apparatus and the computer are interconnected by the communication circuit, the error notification mail and the operation notification mail created by the error notification creation means and the operation notification creation means respectively are transmitted from the apparatus to the computer. Furthermore, because each of these mails having been transmitted is displayed by the operation notification mail display means and the error notification mail display means, respectively, the operator always can understand the current operating condition and the occurrence of failure of the apparatus, and the like, on the side of the computer.

While the invention has been explained with reference to the specific embodiments of the invention, the explanation is illustrative and the invention is limited only by the appended claims.

What is claimed is:

1. A communication system for automatic synthesis apparatus, comprising:

an automatic synthesis apparatus having a reaction block to produce synthetic compounds based on synthesis procedures, operation notification creation means for creating operation notification mails according to operating conditions in the synthesis procedures, and error notification creation means for creating an error notification mail when an error occurs during the procedure, and a computer electrically connected to the automatic synthesis apparatus and including per-operation transmission setting means for setting to the automatic synthesis apparatus as to whether transmissions of the operation notification mails along the synthesis procedures to the computer are performed or not, operation notification mail display means for displaying the operation notification mail transmitted from the automatic synthesis apparatus by the per-operation transmission setting means, and error notification mail display means for displaying the error notification mail created by the error notification creation means and transmitted from the automatic synthesis apparatus.

2. A communication system according to claim 1, wherein said operation notification creation means creates operation notification mails along the operating conditions in the synthesis procedures so that the operating conditions can be monitored sequentially as desired by the operation notification mail display means.

3. A communication system according to claim 2, wherein said automatic synthesis apparatus further includes a plurality of reaction vessels for performing the synthesis reactions, a plurality of kinds of reagents and solvents to be distributed to the reaction vessels, and means for providing the reagents and solvents to the reaction vessels.

4. A communication system according to claim 1, wherein said operation notification creation means creates the operation notification mails entirely along the synthesis procedures, and said per-operation transmission setting means selects the operation notification mails created at the operation notification creation means so that the operation notification mails selected at the operation transmission setting means are only transmitted to the display means.

* * * * *